(12) United States Patent
Srivastava et al.

(10) Patent No.: US 9,081,732 B2
(45) Date of Patent: Jul. 14, 2015

(54) RECOVERY OF A COMPUTER THAT INCLUDES VIRTUAL DISKS

(75) Inventors: Abhinav Srivastava, Hyderabad (IN);
Ran Kalach, Bellevue, WA (US);
Jingbo Wu, Sammamish, WA (US);
Dinesh Haridas, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 535 days.

(21) Appl. No.: 13/405,417

(22) Filed: Feb. 27, 2012

(65) Prior Publication Data

US 2012/0159240 A1 Jun. 21, 2012

Related U.S. Application Data

(63) Continuation of application No. 12/242,933, filed on Oct. 1, 2008, now Pat. No. 8,150,801.

(51) Int. Cl.
*G06F 17/30* (2006.01)
*G06F 11/14* (2006.01)

(52) U.S. Cl.
CPC ........ *G06F 11/1469* (2013.01); *G06F 11/1435* (2013.01); *G06F 11/1458* (2013.01); *G06F 2201/815* (2013.01)

(58) Field of Classification Search
USPC ........... 707/609, 640, 647; 711/111, 112, 162
IPC ....................................................... G06F 17/30
See application file for complete search history.

(56) References Cited

U.S. PATENT DOCUMENTS

| 6,047,294 | A | 4/2000 | Deshayes et al. |
| 6,820,214 | B1 | 11/2004 | Cabrera et al. |
| 7,093,086 | B1 | 8/2006 | Van Rietschote |
| 7,293,272 | B1 | 11/2007 | Okcu et al. |
| 7,669,020 | B1 * | 2/2010 | Shah et al. ................... 711/162 |
| 2002/0095557 | A1 | 7/2002 | Constable et al. |
| 2003/0014585 | A1 | 1/2003 | Ji |
| 2005/0216788 | A1 | 9/2005 | Mani-Meitav et al. |
| 2006/0112313 | A1 | 5/2006 | Tripp et al. |
| 2007/0061514 | A1 | 3/2007 | Yamamoto |
| 2007/0174658 | A1 | 7/2007 | Takamoto et al. |

(Continued)

FOREIGN PATENT DOCUMENTS

| EP | 1950659 A1 | 7/2008 |
| JP | 2007052772 A | 3/2007 |

(Continued)

OTHER PUBLICATIONS

Response to Communication, Application No. EP 09808743.0, dated Oct. 15, 2012, 15 pages.

(Continued)

*Primary Examiner* — Yicun Wu
(74) *Attorney, Agent, or Firm* — Brian Haslam; Mike Allen; Micky Minhas

(57) ABSTRACT

Described is the backup and/or restore of virtual disks In general, metadata is backed up for restoring a virtual disk. To restore the disk, a physical disk is created, with the virtual disk the created on a partition of the physical disk. Backup and restore is described for nested virtual disks, including for block level restore. Further described is backing up of critical virtual disks and their containers, and virtual disk backup with respect to basic disks and dynamic volumes.

16 Claims, 4 Drawing Sheets

(56) References Cited

U.S. PATENT DOCUMENTS

2007/0250671 A1   10/2007   Lyon
2007/0300034 A1   12/2007   Aoyama

FOREIGN PATENT DOCUMENTS

JP   2007130209 A    5/2007
WO   2007002398 A2   1/2007

OTHER PUBLICATIONS

Supplementary European Search Report, Application No. EP 09808743.0, dated May 16, 2012, 11 pages.
Chinese Patent Application No. 200980132800.6, Office Action dated May 25, 2013, 8 pages, including English Translation.
Chinese Patent Application No. 200980132800.6, Amendment dated Jul. 30, 2013, 15 pages, including English Translation of claims.
Chinese Patent Application No. 200980132800.6, Amendment dated Feb. 17, 2013, 15 pages, including English Translation of claims.
"StorageCraft", Real-Time Recovery (RTR), Retrieved on Jul. 16, 2008, 1 page.
"NetVault: A New Standard in Modular Architecture", NetVault 6.5 Backup and Recovery Software, 2002, 2 pages.
"Bare Metal Recovery and Local Archiving (Server) User's Guide", SonicWALL CDP Series Appliances, 2006, pp. 01-42.
"Automated System Recovery with VERITAS NetBackup", VERITAS Bare Metal Restore, 2002, pp. 01-10.
International Search Report and Written Opinion Received for PCT Application No. PCT/US2009/054221, mailed on Mar. 17, 2010, 12 pages.
Communication Pursuant to Article 94(3) EPC, Application No. EP 09808743.0, dated Oct. 15, 2012, 6 pages.
Response to Communication, Application No. EP 09808743.0, dated Jan. 30, 2013, 7 pages.
Chinese Patent Application No. 200980132800.6, Office Action dated Jan. 23, 2013, 9 pages, including English Translation.
"Notice of Allowance Received for Chinese Patent Application No. 200980132800.6", Mailed Date: Aug. 23, 2013, 2 Pages.
"Office Action Received for Japanese Patent Application No. 2011-523945", Mailed Date: Oct. 3, 2013, 2 Pages. (w/o English Translation).
European Patent Application No. EP 09808743.0, Communication under Rule 71(3) EPC, dated Feb. 25, 2013, 7 pages.
European Patent Application No. EP 09808743.0, Decision to grant a European Patent, dated Jul. 18, 2013, 1 page.
Japanese Patent Application No. 2011-523945, Amendment dated Dec. 25, 2013, 6 pages (with English Translation of claims).
Japanese Patent Application No. 2011-523945, Notice of Allowance dated May 30, 2014, 3 pages.
"Office action received in Korea Patent Application No. 10-2011-7003397", Mailed Date: Apr. 28, 2015, 5 pages. (without English Translation).

* cited by examiner

RECOVERY OF A COMPUTER THAT INCLUDES VIRTUAL DISKS

CROSS-REFERENCE TO RELATED APPLICATIONS

The present application claims priority to and is a continuation of co-pending U.S. patent application Ser. No. 12/242,933 entitled "Recovery of a Computer That Includes Virtual Disks" and filed Oct. 1, 2008 which claims priority to India provisional patent application serial number 2026/CHE/2008, filed Aug. 20, 2008, which are incorporated herein by reference.

BACKGROUND

Virtual machine technology, supported in contemporary Microsoft® Windows®-based operating systems, allows a single physical computing machine to run multiple operating systems at the same time, such as to provide multiple server environments. In such technology, a virtual disk is a file that may be stored on a physical disk drive or on another virtual disk drive, yet is in a format that allows the file to be used (surfaced) as a disk device. For example, a virtual disk may be in a Microsoft® Virtual Hard Disk (VHD) format, whereby any driver that understands the VHD format is able to mount the VHD file as a disk device, that is, a virtual disk is a disk device created by having a VHD driver mount a VHD file. Such virtual disks can also be created and surfaced on a Windows® operating system running on a physical machine. These virtual disks can be used to store critical operating system files (e.g., a boot volume).

Such operating systems also may provide bare metal recovery support, such as via a technology named ASR (automated system recovery). This technology allows a backed-up computer system data (including state) to be re-created on a different physical machine, e.g., a new replacement machine, a repaired machine with new disks, and so forth. In general, ASR provides the ability for a backup/restore application to backup and restore computer's disk configuration. However, existing ASR technology does not accommodate virtual disks.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which virtual disks of a computing device may restored from backed up metadata. In general, to restore a virtual disk includes creating a physical disk, and creating the virtual disk on a partition of the physical disk.

In one aspect, virtual disks may be nested. To restore such nested virtual disks, a virtual level disk at a level higher is restored before any lower nested level virtual disks. This provides for regular file restore and block level restore.

In one aspect, backing up the virtual disk is also managed. Backup involves evaluating whether disks are critical with respect to backup, and if so, marking any containers thereof that also need to be backed up as critical. Backup also differentiates virtual disk backup with respect to basic disks and dynamic volumes.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an operating system (or like components) that provides the ability to backup and restore a computer's disk configuration, including when one or more of the disks are virtual disks that are stored on one or more physical disks. To this end, and as described herein, this is accomplished by storing metadata information about the virtual disks and their dependencies on physical disk or other virtual disk partitions at backup time in a file, such as a "disk-config-file" in one example.

At recovery time, the disk-config-file is accessed to re-create the disk layout. More particularly, physical disks are created first. Thereafter, virtual disks are created. This process can be further nested to handle situations in which the virtual disks contain other virtual disks. Partitions with virtual disks are mounted to the same namespace as available at the time of backup. This allows the backup vendors or the like to restore data to the virtual disks after they are created, and be mounted to the same namespace.

In other words, one example process creates the physical disks, and partitions and creates volumes for the physical disks. Then, any virtual disk(s) at a first nesting level (level 1) are created, after which the process partitions and creates volumes for the level 1 virtual disk(s). If there are one or more level 2 virtual disks, they are created, following by the partitioning and creating of volumes for the level 2 virtual disks, and so on to the deepest nesting level. The saved metadata contains sufficient information to find the nesting levels of each virtual disk for layered (level-by level) re-creation of virtual disks. Such level by level re-creation of virtual disks allows block level operations within each level as described below.

Figure 1:
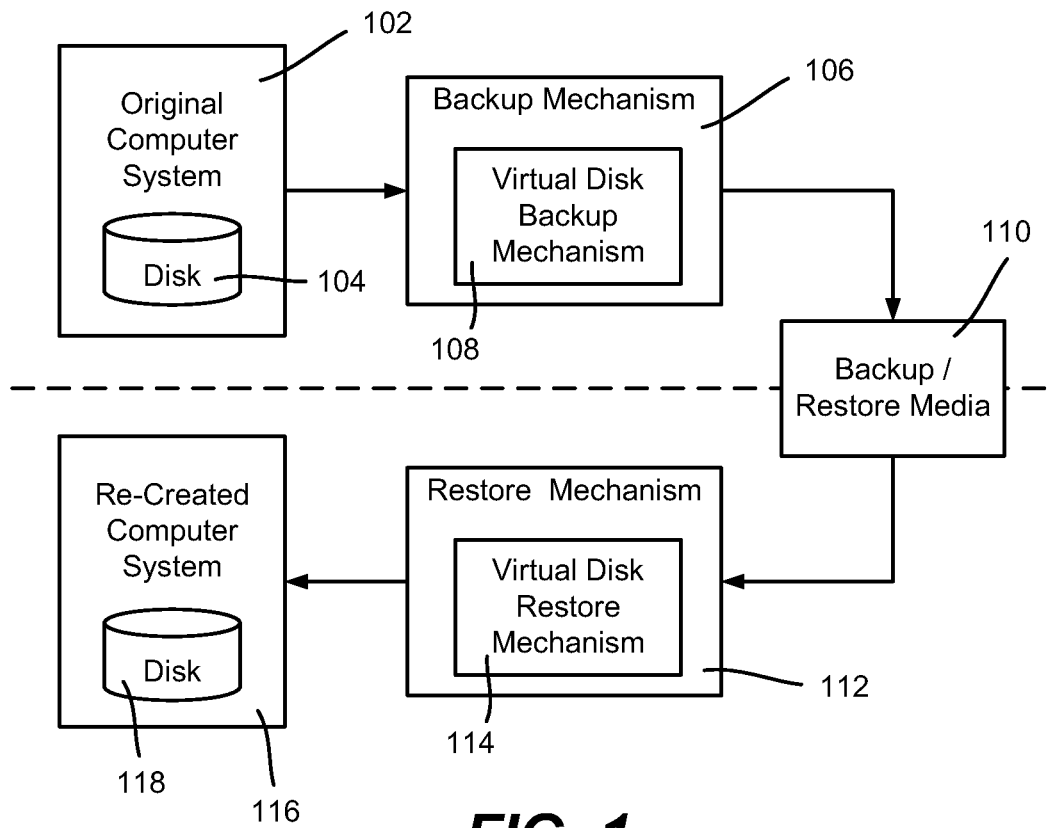
FIG. 1 is a block diagram representing example components in a backup and restore system including for backing up and restoring virtual disks.

Turning to FIG. 1, there is shown an example block diagram including components used for bare-metal recovery of a computer system 102 with a disk 104 that may contain one or more virtual disks. A backup mechanism 106 includes a virtual disk backup mechanism 108, which, as described below, backs up certain files and metadata to a backup/restore media 110.

At some later time, as indicated by the dashed line, a restore mechanism 112, which includes a virtual disk restore mechanism 114 as also described below, restores the files and metadata to a re-created computer system 116 with a corresponding re-created disk 118. The restore mechanism 112 uses the metadata to create physical disks, then create the virtual disks, including any nested virtual disks.

In one example Windows®-based implementation, the backup mechanism 106 and restore mechanism 112 are provided in an automated system recovery ASR component. However, any program may implement the technology described herein, including in other environments, and/or with other file formats and metadata. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data storage/access in general.

A system can have multiple virtual disks. One example scenario is when the boot volume is on a virtual disk, which is backed by a virtual disk file lying on a system partition (which is physical). In addition to this specific scenario, in general there are virtual disks which are backed by a virtual disk file on a physical volume or on a volume that is on a virtual disk. Backup and restore (e.g., ASR) as described herein handles backup and restore of the disk layout in such scenarios.

Figure 2:
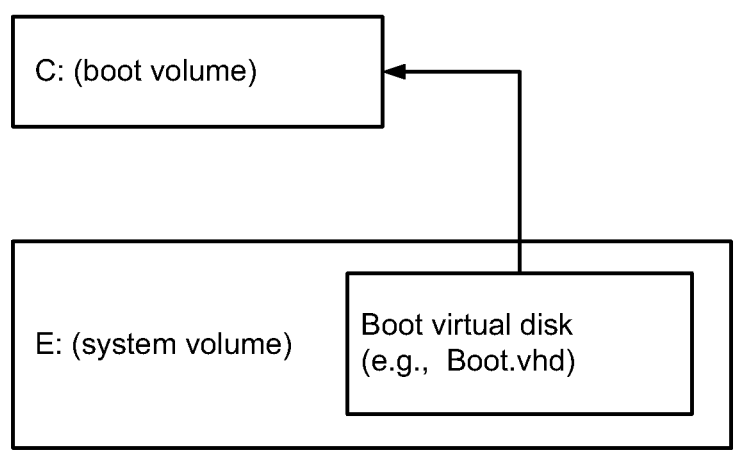
FIG. 2 is a representation of a single volume on a virtual hard disk.
Figure 3:
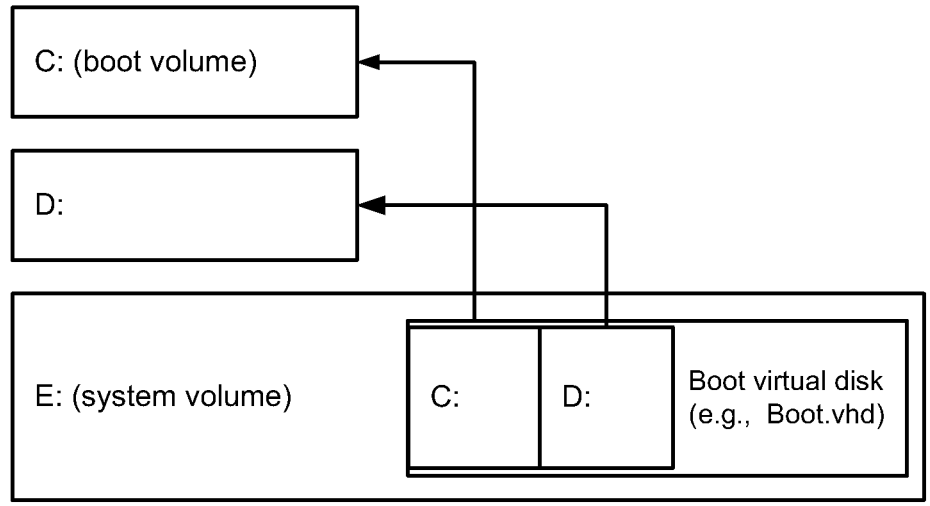
FIG. 3 is a representation of multiple volumes on a virtual hard disk.
Figure 4:
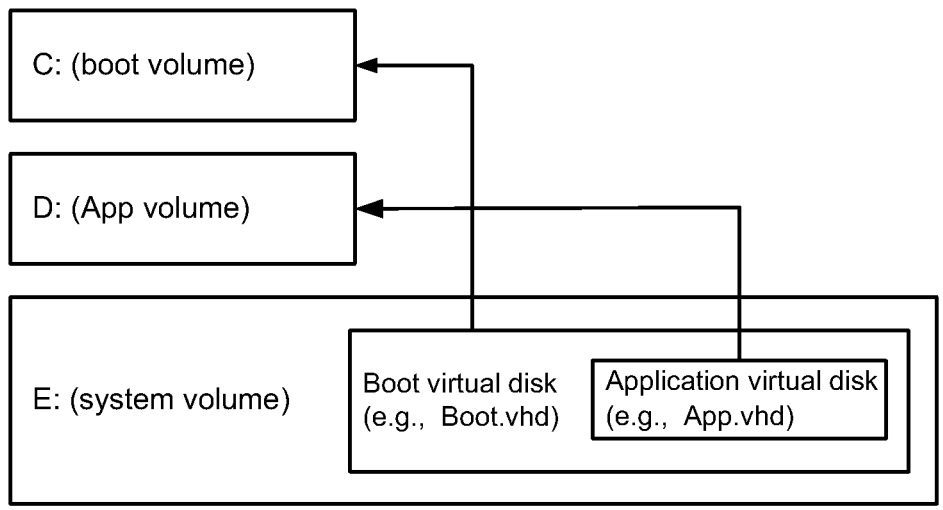
FIG. 4 is a representation of nested virtual hard disks.

FIGS. 2-4 depict various example scenarios. In FIG. 2, which represents a single volume on a virtual disk, E: is a physical volume that is also the container for the virtual disk (e.g., a VHD file, boot.vhd, which backs the boot volume, namely volume C: in this example). The C: volume also may have one or more applications installed on it.

FIG. 3 represents multiple volumes on a single virtual disk. In FIG. 3, E: is a volume that is also the container for the virtual disk file (e.g., boot.vhd), which contains C: (the boot volume) and another volume, volume D:.

FIG. 4 represents nested virtual disks. In FIG. 4, E: is a physical volume that is also the container for the boot virtual disk (e.g., boot.vhd), which backs the boot volume C: The boot virtual disk also contains and application virtual disk, (e.g., App.vhd), which backs volume D: and houses one or more applications.

The following describes an example of backup and restore in a Windows®-based environment, in which automated system recovery (ASR) provides the backup and restore mechanisms. In this example, the file that corresponds to a virtual disk is maintained in the VHD format, with appropriate metadata obtained and maintained for that format. As can be readily appreciated, however, any environment may benefit from the exemplified technology, and/or any suitable file format may be used with appropriate metadata for that format.

In the example, the term "pack" refers to a disk group (a grouping of disks) comprising one or more dynamic disks, (where a dynamic disk is a known concept and in general, is associated with disk groups and stores replicas of the same configuration data).

In an ASR implementation, AsrSystem is the module that is responsible for backing up and recreating the partition layout of the disks and the Volume GUIDs for basic volumes. AsrLdm is the module responsible for backing up and recreating a pack, the dynamic disks in the pack, and the dynamic volumes in the pack. AsrFmt is the module responsible for backing up volumes, and for restoring and formatting the recreated volumes.

A virtual disk file may comprise multiple (e.g., VHD) files. This is useful, such as when a new virtual disk needs to be based on an existing virtual disk, with some changes. This is referred to as differencing; note that for differencing a virtual disk, its whole chain needs to be recreated.

Turning to backup in an ASR environment, ASR backs up the virtual disks. In general, the backup contains enough information by which the virtual disks can be recreated during restore. In one example implementation, ASR uses following win32 APIs and IOCTLs to save the virtual disk information at backup time and to recreate virtual disks at restore time.

Backup
1. GetStorageDependencyInformation.
   a. This API is used during backup, to find out metadata information about mounted virtual disks. This API returns such information, e.g., the file path of the virtual disk file(s) (more than one in case of differencing virtual disk) and other attributes of virtual disk, such as whether the virtual disk is sparse or fixed and the block size of virtual disk.
   b. With respect to virtual disks, this API may return additional information such as virtual disk flags and differencing disk chain sequence information.

Restore
2. CreateVirtualDisk.
   a. This API is used to recreate a virtual disk file based on the information returned by GetStorageDependencyInformation at time of backup.
   b. This API It is used for recreating each virtual disk file.
3. SurfaceVirtualDisk.
   a. Once a virtual disk file is created, this API is used to surface the virtual disk file as a disk.
4. Re-create the volumes in the Virtual disk With respect to backup VSS (Volume Shadow (Copy) Service) components, as with physical disks and volumes, an ASR writer reports the virtual disks and the volumes within it as components. The component for a virtual disk contains a caption such as "This is a virtual disk" or the like to convey helpful information anyone who is looking at ASR metadata. In one example implementation, the disk component looks like:

```
<COMPONENT logicalPath="Disks" componentName="harddisk0"
componentType="filegroup" caption="This is a virtual disk" />
```

With respect to ASR metadata, to recreate a virtual disk, additional information, besides information about the disk layout may be included, such as the virtual disk's file path, and virtual disk type is needed. The layout of each virtual disk is stored in a <MbrDisk> or <GptDisk> node, which is the same as how the physical disk layout is saved. For reference, an MBR node is reproduced here; there is no change in its format:

<MbrDisk> or <GptDisk> node, which is the same as how the physical disk layout is saved. For reference, an MBR node is reproduced here; there is no change in its format:

```
<MbrDisk NumPartitions="4" PartitionTableSize="4" BusKey="2"
DeviceNumber="1" IsCritical="1" MbrSignature="0x88eb9d23" ... >
  <MbrPartition PartitionIndex="0" PartitionFlag="0" BootFlag="0"
    PartitionType="0x7" FileSystemType="0x0"
    NumSymbolicNames="2" PartitionOffset="1048576"
    PartitionLength="5368709120" IsCritical="1">
  </MbrPartition>
  ...
</MbrDisk>
```

The additional information for a virtual disk is stored in a new node, <VirtualDisk>, as follows:

```
<AsrVhd NumDisks="1">
    <VirtualDisk DeviceNumber="1">
        <VhdInfo File="\\?\Volume{e77e0446-d428-11dc-815b-
        000000000000}\p1\p2\foo.vhd" BlockSize=0x200000
        Flag=0x00000008
            Sequence=0>
        <VhdInfo File="\\?\Volume{e77e0446-d428-11dc-815b-
        000000000000}\p1\p2\foo1.vhd" BlockSize=0x200000
        Flag=0x00000008
            Sequence=1>
        ...
    </VirtualDisk>
    ...
</AsrVhd>
```

Note that a new node has been created in one implementation, generally to simplify testing and development. The DeviceNumber attribute in a <VirtualDisk> node is used to lookup its layout information in the <MbrDisk> node. Further, note that VhdInfo node with sequence 0 is the VHD file that represents the virtual disk in VHD format. VhdInfo node with sequence greater than 0 represents the differencing VHD to which this VHD is linked. The Flag value indicates the type of VHD—dynamic or fixed. BlockSize is the size of data blocks used inside VHD file. It is part of VHD format. It is in units of bytes.

Virtual disk information is found as follows:

Open a handle to the disk. Call GetStorageDependencyInformation, with InfoLevel set to 2 and GetParents set to TRUE.

If status returned is STATUS_INVALID_DEVICE_REQUEST, it is not virtual disk, Else if it succeeds it is a virtual disk.

The IOCTL returns STORAGE_QUERY_DEPENDENT_DISK_RESPONSE which is defined as:

```
BOOL WINAPI
GetStorageDependencyInformation (
    __in    HANDLE  hFile,
    __in    BOOL    GetParents
    __in    ULONG   InfoLevel,
    __inout_opt LPVOID StorageDependency,
    __inout ULONG   *StorageDependencyLength
);
```

It contains an array of STORAGE_QUERY_DEPENDENT_DISK_LEV2_ENTRY structures, one for each differencing disk:

```
typedef struct _STORAGE_DEPENDENCY_INFO_LEVEL2{
    ULONG               DependencyTypeFlags;
    ULONG               ProviderSpecificFlags;
    VIRTUALDEVICETYPE   VirtualDeviceType;
    GUID                CallerContext;
    GUID                DiskContext;
    LPWSTR              DependencyDeviceName;
    LPWSTR              HostVolumeName;
    LPWSTR              DependentVolumeName;
    LPWSTR              DependentVolumeRelativePath;
} STORAGE_DEPENDENCY_INFO_LEVEL2,
*PSTORAGE_DEPENDENCY_INFO_LEVEL2;
```

This API returns the sequence information among the differencing disk virtual disk files. ASR differentiates the leaf-most virtual disk file from others in the differencing chain, e.g., represented in a dependency graph.

Certain volume/disks are referred to as "critical" and are marked as such. As in case of physical disks, if a volume inside a mounted virtual disk is critical, then the virtual disk and the pack to which it belongs is marked critical. Further, as a virtual disk is dependent on volume(s) on physical disks or virtual disks (where its virtual disk files reside), the parent also needs to be marked critical.

Two cases need to be considered, including when the parent volume is on a basic disk and when the parent volume is a dynamic volume (e.g., such as with software RAID). When the parent volume is on a basic disk, the mounted virtual disk is marked as critical, so is the mounted partition; because the parent volume is on the basic disk, its parent partition and the parent disk are marked as critical as well.

When the parent volume is a dynamic volume (e.g., such as with software RAID), the mounted virtual disk is marked as critical, so is the mounted partition. In general, a dynamic parent volume does not have a partition associated with it. In general, the dynamic disks that are in the same pack as the disk containing the parent volume are marked as critical; for example, the critical volume info is marked in <AsrLdm> node, where the pack and volume have "IsCritical" properly marked.

Further note that a virtual disk may be dependent on a disk that is excluded at backup; if so and the virtual disk is critical, the backup is failed. Otherwise the virtual disk is marked as excluded and not recreated at restore time, even if it is included at restore time.

Turning to aspects related to restore, during restore ASR first re-creates a virtual disk, mounts it and then re-creates the volumes within it. However, before that can be done, the disk, partition and volumes on which the virtual disk depends need to be re-created. These dependencies may be physical or virtual.

As a result, the disk re-creation needs to happen layer by layer—starting from physical disks, then recreate virtual disks that depend only on physical disks, then recreate virtual disks that depend only on the disks recreated so far, and so on. There are thus three phases included in the overall process of recreating virtual disks:

a) Extraction of disk layout and dependency information of virtual disks from the ASR metadata.
b) Use dependency information to identify the virtual disks whose dependencies have been created.
c) Recreate the virtual disks identified in step (b).
d) Recreate partitions and volumes inside the virtual disks created in step (c).

Steps b, c and d repeat until all VHDs have been recreated or no more VHDs can be recreated. In the case of a backup application that restores a volume as an image ("block level Restore"), the application needs to restore the image after step (d) before steps b, c and d can be repeated for the next nesting level.

The program (or programs) that are used to request a restore (requestors) may choose to skip re-creation of virtual disks by using a SetRestoreOptions as follows:

```
IVssBackupComponents::SetRestoreOptions( asrWriterId ,
VSS_CT_FILEGROUP, NULL, L"ASR", L" ... RecreateVHD=0 ..." );
```

If the "RecreateVHD=0" sub-string is present in restore option string, then ASR does not recreate any virtual disk files and any virtual disk disks.

Turning to the extraction of virtual disk information for restore, the <MbrDisk> and <GptDisk> nodes are de-serialized as with other disks, whereby the layout information is known for virtual disks. After this, the <AsrVhd> node is deserialized. The information about the virtual disk file and any parent virtual disk file is maintained as additional information into the existing struct ASR_DISK_INFO as follows:

```
struct ASR_VHD_INFO
{
    BOOL        fVirtual;
    //
    // \\?\Volume{guid}\p1\p2\foo.vhd
    //
    // The VHD files names are ordered by "Sequence" in <AsrVhd>
    //
    WCHAR       **rgwszVHDFilenames;
    DWORD       dwNumFiles;
    DWORD       dwFlag; // vhd flag - sparse or fixed.
};
struct ASR_DISK_INFO
{
    ...
    //
    // Null if the disk is not virtual.
    //
    ASR_VHD_INFO  *    m_pVirtualDiskInfo;
};
```

A virtual disk is created only if all its dependencies have been created. A virtual disk depends on each volume where the virtual disk file of a virtual disk resides. If each such volume has been recreated, then the virtual disk is recreated.

The virtual disk re-creation phase is performed after the existing AsrSys, AsrLdm and AsrFmt pre-restore is completed. This ensures that the physical volumes (basic or dynamic) on which virtual disk files reside are already recreated. AsrSys has been modified to not consider virtual disks for disk assignment, for re-creation, and for checking that all critical volumes have been recreated.

During virtual disk re-creation, the following example steps may be performed:

```
a.  For each ASR_DISK_INFO pVhdDisk that represents a virtual disk,
    do
b.  {
c.  Using ASR_VHD_INFO:: rgwszVHDFilenames the virtual disk files
    are recreated, starting from the last virtual disk file, so that differencing
    chain is recreated properly.
        If virtual disk file exists on a disk which is excluded, then it is
        not recreated.
        If virtual disk file exists then its corresponding file (e.g., VHD)
        is first dismounted and the virtual disk file is deleted.
d.  virtual disk is mounted using
    ASR_VHD_INFO::rgwszVHDFilenames[0], which is the leaf of
    differencing chain.
e.  Upon mounting the virtual disk, its device path is returned.
f.  Using the path a new ASR_DISK_INFO object, pAssignedVHD, is
    created, initialized and added to the list of disks available on system
    during restore (AsrSystem::m_pDiskListDuringRestore).
g.  As the virtual disk has been created for a specific virtual disk in
    backup, the mechanism performs disk assignment directly: pVhdDisk-
    >AssignedTo is set to pAssignedVHD, and pAssignedVHD->AssignedTo
    is set to pVhdDisk.
h.  The mounted virtual disk is recreated like a physical disk is
    recreated.
i.  If the virtual disk is critical, then any failure during this phase
    causes the whole restore to fail.
j.  }
```

The following APIs are used to recreate virtual disk file(s):

```
Typedef struct _CREATE_VIRTUAL_DISK_PARAMETERS_LEVEL1 {
    VIRTUALDEVICETYPE    VirtualDeviceType; // VHD or ISO - Is VHD for ASR.
    GUID                 UniqueId;
    LARGE_INTEGER        MaximumSize;       // Disk size
    ULONG                BlockSize; // size of data blocks to be used in VHD format.
    ULONG                SectorSize; // 512 bytes.
    ULONG                ProviderSpecificFlags;
    ULONG                Flags; // Sparse or fixed
    LPWSTR               ParentPath; // Base VHD file path in case of differencing disk
    LPWSTR               SourcePath;
} CREATE_VIRTUAL_DISK_LEVEL1_PARAMETERS, *PCREATE_VIRTUAL_DISK_
LEVEL1_PARAMETERS;
BOOL WINAPI
CreateVirtualDisk(
    __in     ULONG               ParameterLevel,
    __in     LPWSTR              Path,   // Path of VHD file
    __in_opt LPVOID              Parameters,
    __in_opt PSECURITY_DESCRIPTOR SecurityDescriptor,    // Security on
                                                          // mounted device.
    __in_opt VIRTUAL_DISK_PROGRESSROUTINE ProgressRoutine,
    __in_opt LPVOID              ProgressRoutineContext
);
```

API for mounting (aka surfacing) virtual disk—

```
typedef struct _SURFACE_VIRUTAL_DISK_LEVEL1_PARAMETERS {
    GUID         CallerContext;
    GUID         DiskContext;
    PSECURITY_DESCRIPTOR SecurityDescriptor;
    ULONG        Timeout;   // Optional timeout to specify while surfacing.
    ULONG        Flags;  // VHD or ISO
    ULONG        ProviderSpecificFlags;
    USHORT       OutputDeviceNameLength;// Mounted device path
    LPWSTR       OutputDeviceNameBuffer;
```

```
} SURFACE_VIRUTAL_DISK__PARAMETERS_LEVEL1,
*PSURFACE_VIRUTAL_DISK_PARAMETERS_LEVEL1;
BOOL WINAPI
SurfaceVirtualDisk(
    __in        LPWSTR                          Path,
    __in        VIRTUALDEVICETYPE               VirtualDeviceType,
    __in        ULONG                           ParameterLevel,
    __in_opt    PVOID                           Parameters,
    __in_opt    VIRTUAL_DISK_PROGRESSROUTINE    ProgressRoutine,
    __in_opt    LPVOID                          ProgressRoutineContext
);
```

With respect to dismounting virtual disks that are already mounted, before recreating a virtual disk, if the virtual disk file already exists and is mounted, then the device and file are removed. One API for dismounting a virtual disk is:

```
BOOL WINAPI
RemoveVirtualDisk(
    __in    VIRTUALDEVICETYPEVirtualDeviceType,
    __in    GUID        CallerContext,
    __in    GUID        DiskContext,
    __in    ULONG       Flags
);
```

To dismount a device, its CallerContext and DiskContext are needed. For this, ASR uses a native virtual disk API, GetStorageDependencyInformation, to enumerate the mounted virtual disks that have a virtual disk file on a give volume.

Doing a dismount for each virtual disk is inefficient, as all mounted virtual disks need to be enumerated every time. So for efficiency, dismounting the virtual disks is done as a onetime operation before recreating virtual disks. It is done as follows:

Compile a list of volume names (no duplicates in the list) on which the virtual disk files that need to be recreated reside.
1. For each volume call GetStorageDependencyInformation with GetParents=FALSE and InfoLevel=1
2. For each STORAGE_DEPENDENCY_INFO_LEVEL1 returned, use its CallerContext and DiskContext to dismount virtual disk.
3. For validation, after the virtual disk re-creation phase, ASR checks that the critical disks present in ASR metadata have been recreated.

The block-level restore needs to be invoked after each level of virtual disks are created and partitioned, before the next level of VHD files can be created.

Such applications may also use a SkipVHDRe-creation option to tell ASR to not attempt to recreate any virtual disk.

Figure 5:
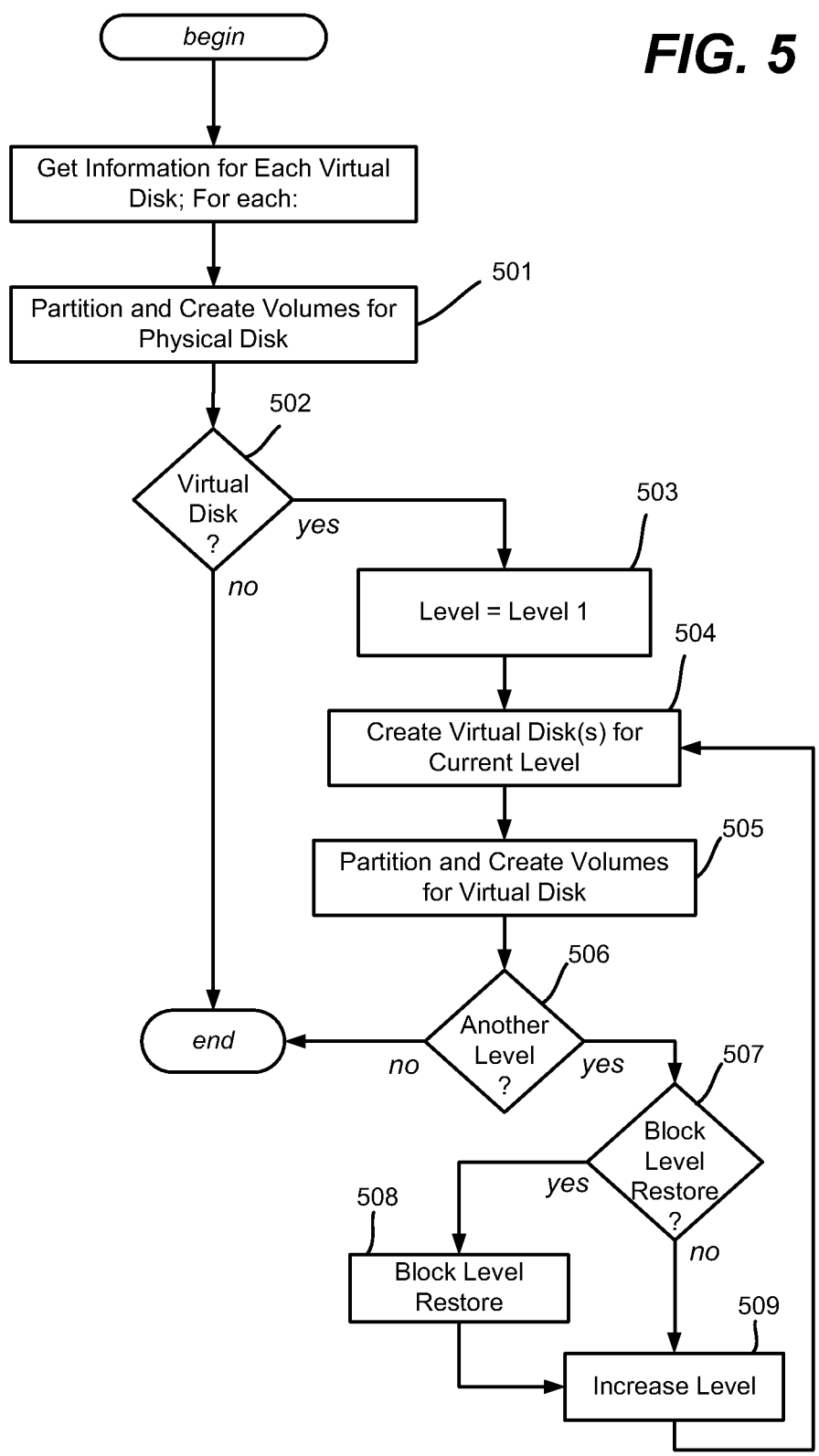
FIG. 5 is a flow diagram representing example steps that may be taken to restore a computer that includes virtual disks.

Turning to a layer by layer re-creation of nested virtual disks, as there can be more layers of virtual disks, like on a virtual disk having its virtual disk files on another virtual disk or a physical volume, the virtual disks are created level by level, as generally represented in FIG. 5 and as follows:

1) Recreate the partitions and volumes on physical disks (step 501).
2) Recreate virtual disk level 1 (step 503)—Find the virtual disks, using ASR metadata, that have all their files lying on the volumes recreated in step 1.
   Recreate the virtual disk's files (step 504 for level 1), surface the virtual disk files as virtual disks and recreate partitions and volumes on it, and format partitions/volumes (step 505 for level 1).
3) Recreate virtual disk level 2 (step 509 increases the level, which, if at step 507 block level restoring is taking place, occurs after the block level restore at step 508)—Find all remaining virtual disks that have their virtual disk files on volumes recreated thus far. The information of what virtual disk file is on which volume is in ASR metadata.
   Recreate the virtual disks files (step 504 for level 2), surface the virtual disks files as virtual disks and recreate partitions and volumes on it, and format partitions/volumes (step 505 for level 2).
4) Repeat 3, until no new virtual disks are recreated (step 502).

One advantage of layer by layer re-creation for block level restore applications is that re-creation of all virtual disks at once is not suitable for block level requestors, as described above. The Block level requestors cannot avoid destroying recreated virtual disks if they also restore the volumes where virtual disk files have been recreated.

This is solved using layer by layer re-creation, by adding an API to the ASR writer object interface—HRESULT IVssAsrWriterRestoreEx::RecreateNextLayer(void), which allows requestors to tell ASR when to create the next layer. The requestors need not be aware of virtual disks and their dependencies.

The requestor may operate interactively with the ASR as set forth below:
1. Requestor calls IVssBackupComponents::PreRestore
2. ASR recreates the physical disks
   Requestor restores only those volumes that have been recreated out of the ones it has backed up. It can find it by calling FindFirstVolume/findNextVolume.
3. Requestor calls IvssAsrWriterRestoreEx::RecreateNextLayer
   ASR recreates more volumes by recreating virtual disks as mentioned in step 2 above. If there are no more volumes recreated, it returns S_FALSE
4. Requestor again repeats steps 2 and 3, until ASR returns S_FALSE.

With respect to re-creation of dynamic volumes during layered virtual disk re-creation, in general, a dynamic pack may consist of some virtual disks and some physical disks or entirely virtual disks. These dynamic virtual disks may be lying on other virtual disks and so are nested. During the layer-by-layer re-creation, the following additional logic in ASR takes care of recreating dynamic disks and volumes as well:
1. After physical disk re-creation recreate a physical pack using AsrLdm as usual, with following modification:
   a. All disks for pack may not be available just yet, as they may be virtual disks, so create the pack even if at least all physical disks in pack have been recreated.
   b. Once all virtual disks for a layer have been identified, surfaced and partitioned, see if the disk was a dynamic disk (this can be found by consulting ASR metadata).

2. If the virtual disk is a dynamic disk,
   a. Add the virtual disk to dynamic pack recreated during physical disk re-creation
   b. Find out, from AsrLdm metadata, the volumes in the pack (that have not been recreated yet) that lie entirely on the set of disks added to pack thus far. Re-create and format these volumes.
3. The termination condition for ASR continues to be the same, i.e., if no new volumes were recreated it terminates the disk re-creation.

As can be seen, as virtualization becomes increasingly used, the bare metal recovery of machines running virtual disks is needed. This includes bare metal recovery of physical machine booting from a virtual disk, and bare metal recovery of a physical machine having multi-level virtual disks (virtual disks mounted within virtual disks).

Moreover, backup and restore are only one example use for the virtualization-related technology described herein. Migration of a virtual environment to another machine may similarly be performed with this technology. Further, consider a host partition running hypervisor to supervise virtual machines as guests. Automated system recovery and/or migration of such hosts, e.g., having guests with virtual disks, may be performed via this technology.

Exemplary Operating Environment

Figure 6:
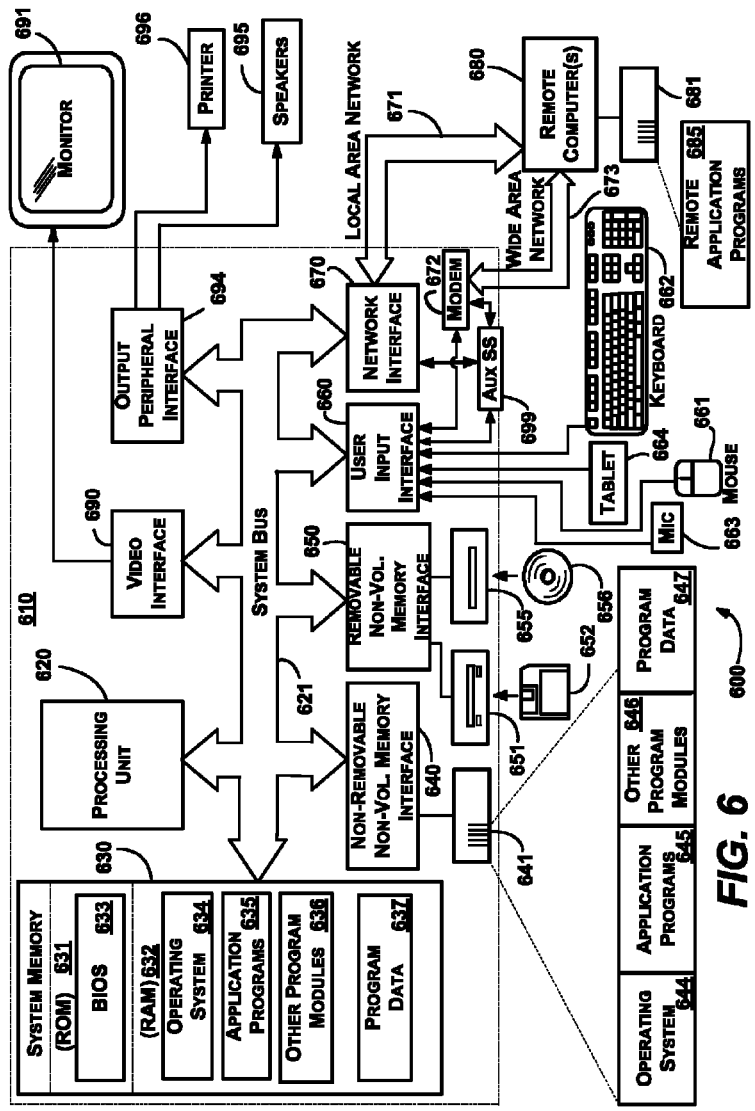
FIG. 6 shows an illustrative example of a computing environment into which various aspects of the present invention may be incorporated.

FIG. 6 illustrates an example of a suitable computing system environment 600 on which the examples and/or embodiments represented in FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a remote control (R/C) 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising, restoring a virtual disk, including based upon metadata maintained at a backup time of the computing environment, creating a physical disk, and creating the virtual disk on a partition of the physical disk, wherein the virtual disk is a file in a format that allows the file to be used as a disk device, wherein restoring the virtual disk includes surfacing and partitioning the virtual disk in a layered operation that first re-creates physical disks and then re-creates virtual disks that depend only on physical disks.

2. The method of claim 1 wherein restoring the virtual disk includes determining that the virtual disk is associated with a first nesting level, and restoring the virtual disk and another virtual disk at a second nesting level in a layered order based on each virtual disk's associated level.

3. The method of claim 2 wherein the virtual disk is configured for block level restore, and wherein restoring the virtual disk comprises performing a block level restore at the first nesting level.

4. The method of claim 1, wherein restoring the virtual disk further includes re-creating virtual disks that depend on recreated disks such that a particular virtual disk is re-created only if all dependencies have been re-created.

5. In a computing environment, a method comprising, backing up a virtual disk for subsequent restoration, including maintaining metadata for re-creating the virtual disk, wherein the virtual disk is a file in a format that allows the file to be used as a disk device, wherein the metadata includes information to restore the virtual disk in a layered operation that first re-creates physical disks and then re-creates virtual disks that depend only on physical disks.

6. The method of claim 5 wherein the metadata includes dependency information, or wherein the metadata includes level information, or wherein the metadata includes both dependency information and level information.

7. The method of claim 5 further comprising, determining that a volume or disk is an operating system boot volume, and marking the volume or disk as critical.

8. The method of claim 5 further comprising, determining whether a volume inside a mounted virtual disk is an operating system boot volume, and if so, marking the virtual disk and a pack to which it belongs as critical.

9. The method of claim 5 further comprising, determining whether a virtual disk is dependent on a volume or on a virtual disk where its virtual disk files reside, and if so, marking a parent volume of the virtual disk as critical.

10. The method of claim 5 further comprising, determining whether a the parent volume is on a basic disk, and if so, marking a mounted virtual disk as critical, marking a mounted partition as critical, marking a parent partition as critical, and marking a parent disk as critical.

11. The method of claim 5 further comprising, determining whether a parent volume is a dynamic volume, and if so, marking a mounted virtual disk as critical, marking a mounted partition as critical, and marking any dynamic disk that is in a same pack as the disk containing the parent volume as critical.

12. The method of claim 5 further comprising, ensuring that no virtual disk that is marked as critical is dependent on a disk that is excluded at backup.

13. In a computing environment, a system, comprising:
a computer comprising a restore mechanism, the restore mechanism configured to perform actions, including:
restoring a virtual disk, including creating a physical disk, and creating the virtual disk on a partition of the physical disk, wherein the virtual disk is a file in a format that allows the file to be used as a disk device, wherein restoring the virtual disk includes surfacing and partitioning the virtual disk in a layered operation that re-creates physical disks and then re-creates virtual disks that depend only on physical disks.

14. The system of claim 13, wherein restoring the virtual disk includes determining that the virtual disk is associated with a first nesting level, and restoring the virtual disk and another virtual disk at a second nesting level in a layered order based on each virtual disk's associated level.

15. The system of claim 14, wherein the virtual disk is configured for block level restore, and wherein restoring the virtual disk comprises performing a block level restore at the first nesting level.

16. The system of claim 13, wherein restoring the virtual disk further includes re-creating virtual disks that depend on recreated disks such that a particular virtual disk is re-created only if all dependencies have been re-created.

* * * * *